US 9,896,105 B2

(12) United States Patent
Ly

(10) Patent No.: US 9,896,105 B2
(45) Date of Patent: Feb. 20, 2018

(54) SYSTEMS AND METHODS FOR CONTROLLING A VEHICLE'S DECELERATION LEVEL BY CONTROLLING THE ALTERNATOR OUTPUT

(71) Applicant: Toyota Motor Engineering & Manufacturing North America, Inc., Erlanger, KY (US)

(72) Inventor: Tai J. Ly, Los Angeles, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 14/794,446

(22) Filed: Jul. 8, 2015

(65) Prior Publication Data

US 2017/0008530 A1  Jan. 12, 2017

(51) Int. Cl.

| B60T 8/1755 | (2006.01) |
|---|---|
| B60T 8/172 | (2006.01) |
| B60W 10/184 | (2012.01) |
| B60W 30/18 | (2012.01) |
| B60W 50/08 | (2012.01) |
| B60W 10/06 | (2006.01) |

(Continued)

(52) U.S. Cl.
CPC ...... *B60W 30/18145* (2013.01); *B60W 10/06* (2013.01); *B60W 10/30* (2013.01); *B60W 30/18072* (2013.01); *B60W 50/082* (2013.01); *H02J 7/1446* (2013.01); *B60W 2030/18081* (2013.01); *B60W 2510/1005* (2013.01); *B60W 2520/10* (2013.01); *B60W 2540/10* (2013.01);

*B60W 2540/18* (2013.01); *B60W 2720/106* (2013.01); *Y02T 10/84* (2013.01)

(58) Field of Classification Search
CPC ......... B60W 30/18136; B60W 10/196; B60W 10/20; B60W 30/18145; B60W 30/182; B60W 2400/00; B60W 2720/106
USPC .......................................................... 701/70
See application file for complete search history.

(56) References Cited

U.S. PATENT DOCUMENTS

| 3,688,171 A | 8/1972 | Salihi et al. |
|---|---|---|
| 5,661,378 A | 8/1997 | Hapeman |

(Continued)

FOREIGN PATENT DOCUMENTS

| FR | 2911099 | 1/2007 |
|---|---|---|
| WO | WO2010/073328 | 7/2010 |

(Continued)

*Primary Examiner* — Jean-Paul Cass
(74) *Attorney, Agent, or Firm* — Snell & Wilmer LLP

(57) ABSTRACT

A system for controlling a deceleration level or rate of a vehicle. The system includes an accelerator pedal, an accelerator pedal sensor configured to determine whether the accelerator pedal is depressed or released, an alternator having a resistance and an output current and a driving mode switch having an economy mode, a normal mode and a sport mode. The system also includes a vehicle speed sensor for determining a vehicle speed of the vehicle, a memory for storing a preferred range for a vehicle speed and an ECU configured to transmit a first instruction signal to the alternator to increase or decrease its resistance or output current based on a mode set by the driving mode switch when the accelerator pedal is released and the vehicle speed is within the preferred range of the vehicle speed.

20 Claims, 5 Drawing Sheets

(51) Int. Cl.
 *B60W 10/30* (2006.01)
 *H02J 7/14* (2006.01)

(56) References Cited

U.S. PATENT DOCUMENTS

| | | | |
|---|---|---|---|
| 6,051,951 A | 4/2000 | Arai et al. | |
| 6,433,519 B2 | 8/2002 | Taniguchi et al. | |
| 6,466,024 B1 | 10/2002 | Rogers | |
| 6,801,020 B2 | 10/2004 | Blackburn | |
| 6,986,335 B2 | 1/2006 | Sieber et al. | |
| 7,479,707 B2 | 1/2009 | Sulzer | |
| 8,215,282 B2 | 7/2012 | McDonald et al. | |
| 8,417,428 B2 | 4/2013 | Otake | |
| 8,790,218 B2 | 7/2014 | Morimura et al. | |
| 8,821,345 B2 | 9/2014 | Noumura | |
| 2007/0106447 A1 | 5/2007 | Ogawa | |
| 2007/0225882 A1* | 9/2007 | Yamaguchi | B60W 30/095 701/36 |
| 2009/0054202 A1* | 2/2009 | Yamakado | B60K 6/48 477/6 |
| 2010/0289460 A1* | 11/2010 | Otake | H02P 9/04 322/19 |
| 2011/0307145 A1* | 12/2011 | Kato | B60K 6/48 701/36 |
| 2012/0109480 A1* | 5/2012 | Morimura | B60W 10/026 701/70 |
| 2013/0116914 A1* | 5/2013 | Morimura | B60L 11/14 701/112 |
| 2013/0131931 A1* | 5/2013 | Mitsuyasu | F02D 29/02 701/48 |
| 2013/0289830 A1* | 10/2013 | Kamiya | B60L 7/18 701/48 |
| 2014/0080656 A1* | 3/2014 | Lippert | F16H 3/66 475/275 |
| 2014/0129085 A1* | 5/2014 | Shartle | B62D 15/0235 701/41 |
| 2016/0101770 A1* | 4/2016 | Yamazaki | B60W 10/02 701/99 |

FOREIGN PATENT DOCUMENTS

| | | | | |
|---|---|---|---|---|
| WO | WO 2015019085 A2 * | 2/2015 | | B60K 6/10 |
| WO | WO 2015087516 A2 * | 6/2015 | | B60L 7/14 |

\* cited by examiner

SYSTEMS AND METHODS FOR CONTROLLING A VEHICLE'S DECELERATION LEVEL BY CONTROLLING THE ALTERNATOR OUTPUT

BACKGROUND

1. Field

The present invention relates to systems and methods for controlling a vehicle's deceleration level by controlling the alternator output.

2. Description of the Related Art

Different systems and methods have been developed to control a vehicle's deceleration. For example, a driver may apply force to a brake pedal inside the vehicle that causes the brake pads to push against rotors to slow down the vehicle's wheels, which in turn decelerates the vehicle. Depending upon the force applied to the brake pedal and the length of time the brake pedal is pressed, the vehicle will decelerate accordingly.

A vehicle's deceleration can also be controlled using a speed change controller that is generally used with automatic transmissions. The speed change controller automatically controls gear shifting by following a predetermined deceleration gear shifting pattern based on the gear shift position, the vehicle's speed and a value corresponding to the gradient of the road surface when the deceleration of the vehicle is detected (i.e., when the accelerator pedal is released during driving). The speed change controller brings about a deceleration effect through engine braking.

In some systems and methods, the vehicle's deceleration level is based solely on engine load, resistance in drivetrain (e.g., gear ratio or differential ratio) and rolling resistance.

The above systems and methods however are limited in how the vehicle's deceleration can be controlled, for example, due to the vehicle's predetermined deceleration gear shifting pattern. Therefore, a need exists for systems and methods for providing the driver and vehicle with better and more effective control of the vehicle's deceleration level.

SUMMARY

A system for controlling a deceleration level or rate of a vehicle. The system includes an accelerator pedal configured to control an acceleration or movement of the vehicle, an accelerator pedal sensor configured to determine whether the accelerator pedal is depressed or released, an alternator having a resistance and an output current and a driving mode switch having an economy mode, a normal mode (or a comfort mode) and a sport mode. The system also includes a vehicle speed sensor for determining a vehicle speed of the vehicle, a memory for storing a preferred range for a vehicle speed and an electronic control unit configured to transmit a first instruction signal to the alternator to increase or decrease its resistance or output current based on a mode set by the driving mode switch when the accelerator pedal is released and the vehicle speed is within the preferred range of the vehicle speed and transmit a second instruction signal to the alternator to increase or decrease its resistance or output current based on the normal mode when the accelerator pedal is released and the vehicle speed is outside the preferred range of the vehicle speed.

A method for controlling a deceleration level or rate of a vehicle having an accelerator pedal. The method includes determining, using an accelerator pedal sensor, whether the accelerator pedal is depressed or released, determining, using a vehicle speed sensor, a current vehicle speed of the vehicle and determining, using an electronic control unit, a current setting of a driving mode switch. The method also includes storing, in a memory coupled to the electronic control unit, a preferred range for a vehicle speed and transmitting, using the electronic control unit, a first instruction signal to an alternator to increase or decrease its resistance or output current based on the current setting of the driving mode switch when the accelerator pedal is released and the current vehicle speed is within the preferred range for the vehicle speed.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
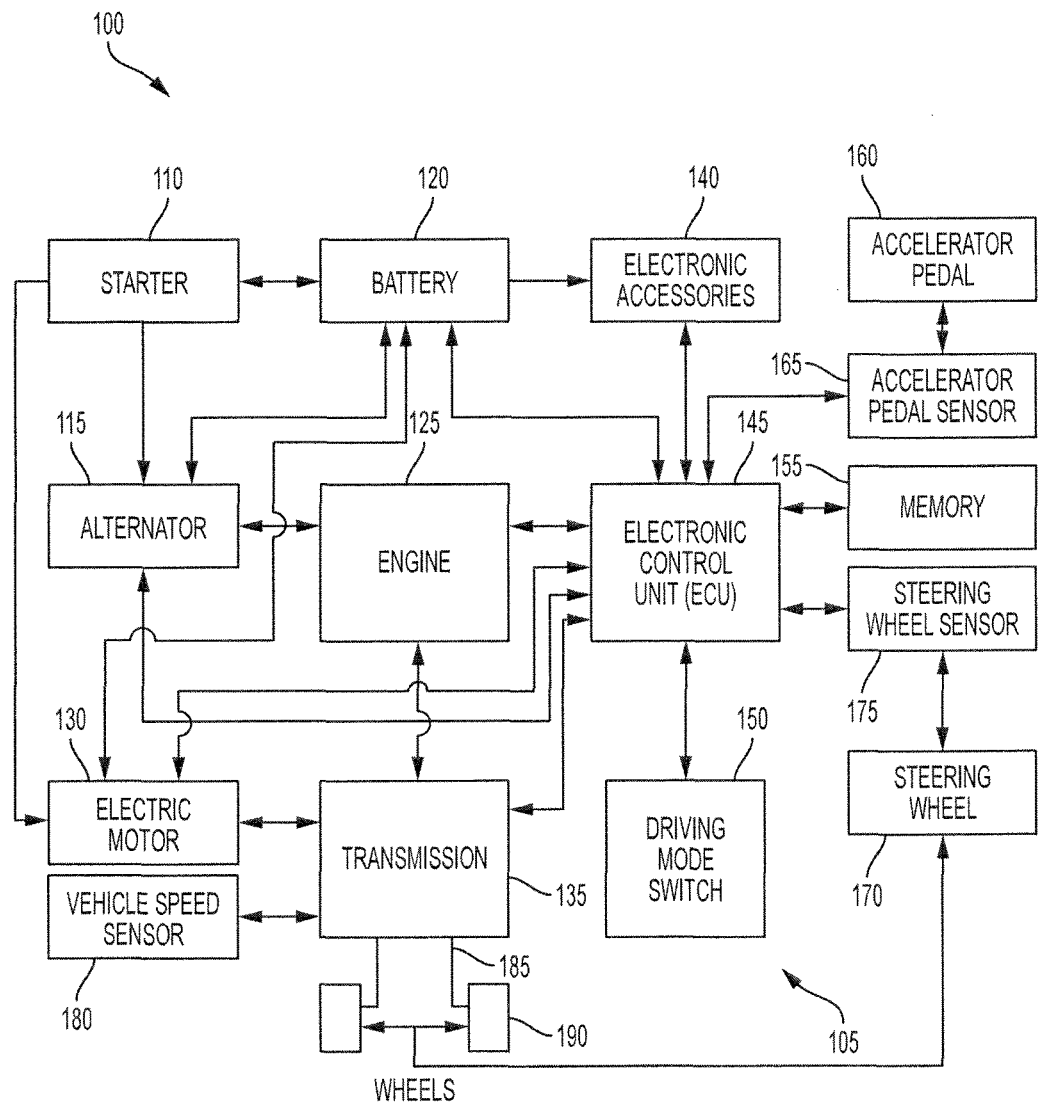
FIG. 1 illustrates an exemplary block diagram of a system for controlling a vehicle's deceleration level according to an embodiment of the present invention.

The invention provides systems and methods for controlling a vehicle's deceleration level by controlling, for example, the alternator output. The systems and methods described herein allow for driver controlled adjustments of the vehicle's deceleration by allowing the driver to directly and indirectly adjust the amount of current output by the alternator. During vehicle deceleration (i.e., the accelerator pedal 160 is released), the designer or the manufacturer can adjust or alter the amount of current output from the alternator 115 to control the desired deceleration level or rate. In addition, the designer or the manufacturer may store a preferred range in the memory 155 for one or more of (1) the vehicle speed, (2) the gear or the transmission ratio and/or (3) the steering angle (step 235). The preferred range advantageously allows the designer or the manufacturer to set when and when not to adjust or alter the deceleration level or rate of the vehicle 105. For example, the deceleration level may be adjusted (i.e., faster) only when the transmission is in gears 3-8.

An electronic control unit (ECU) and a driving mode switch can be used to directly and indirectly adjust the amount of current output by the alternator. For example, the driver, using the driving mode switch, can make adjustments to the amount of current being output from the engine's alternator to achieve a desired vehicle deceleration level. The driving mode switch allows the driver to switch between various vehicle modes such as economy mode, normal mode, sport mode or sport plus mode. The ECU receives the driving or operating mode information and then based on this information, controls or adjusts the amount of current output by the alternator. This advantageously allows for more accurate and better control over the vehicle's deceleration level. This also advantageously allows the driver to have more precise handling and better control of the vehicle and a better feel and response over the vehicle's deceleration. Hence, the driver is able to directly and indirectly adjust or control the amount of current being output from the engine's alternator to achieve a desired vehicle deceleration level.

An exemplary system for controlling a deceleration level or rate of a vehicle. The system includes an accelerator pedal configured to control an acceleration or movement of the vehicle, an accelerator pedal sensor configured to determine whether the accelerator pedal is depressed or released, an alternator having a resistance and an output current and a driving mode switch having an economy mode, a normal mode and a sport mode. The system also includes a vehicle speed sensor for determining a vehicle speed of the vehicle, a memory for storing a preferred range for a vehicle speed and an electronic control unit configured to transmit an instruction signal to the alternator to increase or decrease its resistance or output current based on a mode set by the driving mode switch when the accelerator pedal is released and the vehicle speed is within the preferred range of the vehicle speed and transmit an instruction signal to the alternator to increase or decrease its resistance or output current based on the normal mode when the accelerator pedal is released and the vehicle speed is outside the preferred range of the vehicle speed.

FIG. 1 illustrates an exemplary block diagram of a system 100 for controlling a vehicle's deceleration level according to an embodiment of the present invention. The system 100 can be incorporated or implemented into a vehicle 105 such as a non-hybrid, standard internal combustion engine (ICE) vehicle, an electric vehicle (EV), a hybrid vehicle (HV), a plug-in hybrid vehicle (PHV), a fuel cell vehicle (FCV), a fuel cell electric vehicle (FCEV) and other similar vehicles.

The system 100 or the vehicle 105 can include a starter 110, an alternator 115, a battery 120, an internal combustion engine 125, an electric motor 130, a transmission 135 (e.g., a continuously variable transmission (CVT)), electronic accessories 140, an electronic control unit (ECU) 145, a driving mode switch 150, a memory 155, an accelerator pedal 160, an accelerator pedal sensor 165, a steering wheel 170, a steering wheel sensor 175, a vehicle speed sensor 180, a drive axle 185 and/or wheels 190. In various embodiments, the system 100 and/or the vehicle 105 can include different combinations of components and devices from what is shown in FIG. 1.

The starter 110 is an electronic switch used to start and stop the engine 125 and/or the electric motor 130. The alternator 115 is coupled to the engine 125 and generates electric power based on rotation of the engine 125. The electric power generated by the alternator 115 may be utilized to power the electronic accessories 140 of the vehicle 105. Further, the electric power generated by the alternator 115 may be utilized to charge the battery 120 of the vehicle 105. The battery 120 is used to provide energy or power to the starter 110, the alternator 115, the electric motor 130, the electronic accessories 140, the ECU 145, the driving mode switch 150, the memory 155, the accelerator pedal sensor 165, the steering wheel sensor 175 and/or the vehicle speed sensor 180.

The engine 125 is mechanically connected to the drive axle 185 via the transmission 135. The drive axle 185 is connected to the wheels 190. The operation of the transmission 135 by the engine 125 causes the drive axle 185 to rotate the wheels 190. The term "engine" will be used in this disclosure to refer to an internal combustion engine but one skilled in the art will know how to utilize other energy or power generation devices such as the electric motor 130 or a fuel cell in place of or in addition to the engine 125. The electric motor 130 may be connected in a similar manner as the engine 125.

The electronic accessories 140 can include cameras, power windows, power doors and locks, sensors, windshield wipers, lights, navigation systems, infotainment systems, heating, ventilation and air conditioning (HVAC) systems, motors, electronics, etc.

The ECU 145 may include a microprocessor that has a CPU, a ROM, a RAM, etc., which are interconnected via buses (not illustrated). The functions and operations of the ECU 145 can be implemented using software, hardware and combinations thereof. The components, sensors, systems and devices described herein can all provide information and data to the ECU 145. In addition, even though one ECU 145 is shown in FIG. 1, the system 100 and the vehicle 105 can include multiple ECUs. For example, the ECU 145 can share the information and data with other ECUs, such as a dynamics ECU (e.g., to control traction control, ABS, etc.), an energy management ECU (e.g., to control engine and electric motor operations), a self-driving ECU (e.g., allows the vehicle to self-drive), etc.

The driving mode switch 150 is an electronic switch, a touch screen button or sensor or a gear shifter that allows the driver to switch between operating modes of the vehicle 105, which alters the rate of acceleration and deceleration of the vehicle 105. The various operating modes of the vehicle 105 can include an economy mode, a normal mode, a sport mode and a sport plus mode. The driving mode switch 150 provides the operating mode information to the ECU 145. Based on the specific driving or operating mode selected by the driver, the ECU 145 generates and transmits data and instructions to the alternator 115, the battery 120, the engine 125, the electric motor 130 and/or the transmission 135. The ECU 145 may receive or retrieve the data and instructions (such as the data from Table 1 below) from the memory 155 and/or the sensors (e.g., the accelerator pedal sensor 165, the steering wheel sensor 175, the vehicle speed sensor 180, etc.) to more accurately and better control the operations of the vehicle 105.

TABLE 1

| Mode of Operation | Alternator Output Current (Range) | Alternator Output Current (Value) |
|---|---|---|
| Economy Mode | 20-30 Amperes | 25 Amperes |
| Normal Mode | 30-40 Amperes | 35 Amperes |
| Sport Mode | 40-65 Amperes | 50 Amperes |
| Sport Plus Mode | 65-75 Amperes | 70 Amperes |

As shown above in Table 1, the position or selection of the driving mode switch 150 in combination with the ECU 145 can be used to make adjustments to the amount of current being output from the engine's alternator 115 to achieve desired vehicle deceleration levels. A designer or a manufacturer of the system 100 or the vehicle 105 can adjust the range of the alternator's output current (shown in Table 1) to achieve the desired vehicle's deceleration level or rate for each particular driving mode. The numbers in Table 1 are exemplary and the designer or the manufacturer can adjust these based on the vehicle model, type, etc.

The memory 155 stores the data and instructions (including data from the sensors) that are used by the ECU 145 to control the operations and functions of the alternator 115, the engine 125, the electric motor 130, the transmission 135 and/or the electronic accessories 140. For example, the memory 155 may store a range or a value for the alternator output current for a given mode of operation (e.g., the data from Table 1 above). The memory 155 also stores a drive force map that provides a drive force or an amount of force to be applied to the transmission 135 for a given pedal input from the accelerator pedal 160 and a given vehicle speed from the vehicle speed sensor 180. The drive force map can be a table that includes a drive force or an amount of force value for various combinations of given pedal inputs and given vehicle speeds. In addition, many vehicle manufacturers have utilized a different drive force map for each different operating mode (e.g., economy mode, normal mode, sport mode and sport plus mode) to enhance a vehicle's performance and/or fuel economy. A drive force map provides a predetermined relationship between a driver's accelerator pedal input and a desired power/torque output of the vehicle 105. The sport mode allows for more power/torque output per a specified driver acceleration pedal input while the economy mode allows for less power/torque output per a specified driver acceleration pedal input.

Figure 2A:
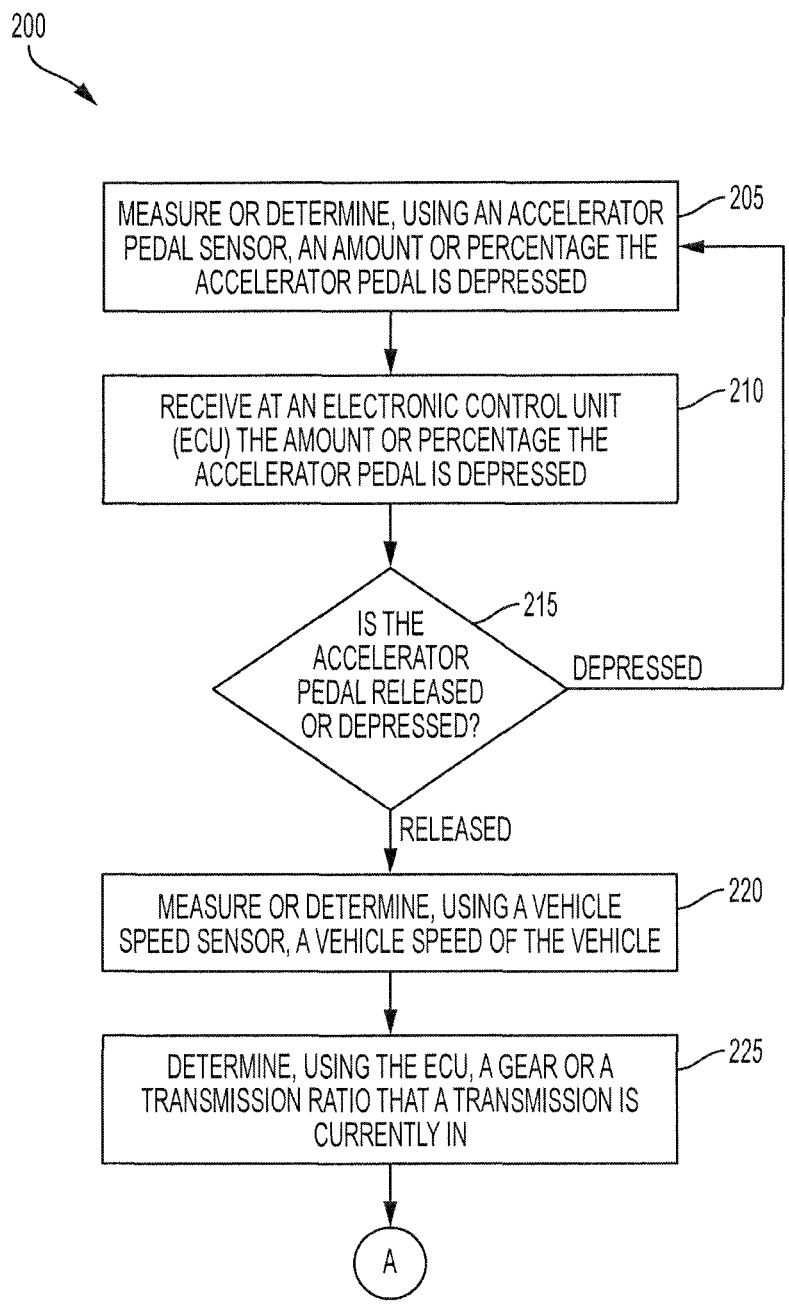
FIGS. 2A and 2B illustrate a flowchart of a method for controlling a vehicle's deceleration level according to an embodiment of the present invention.
Figure 2B:
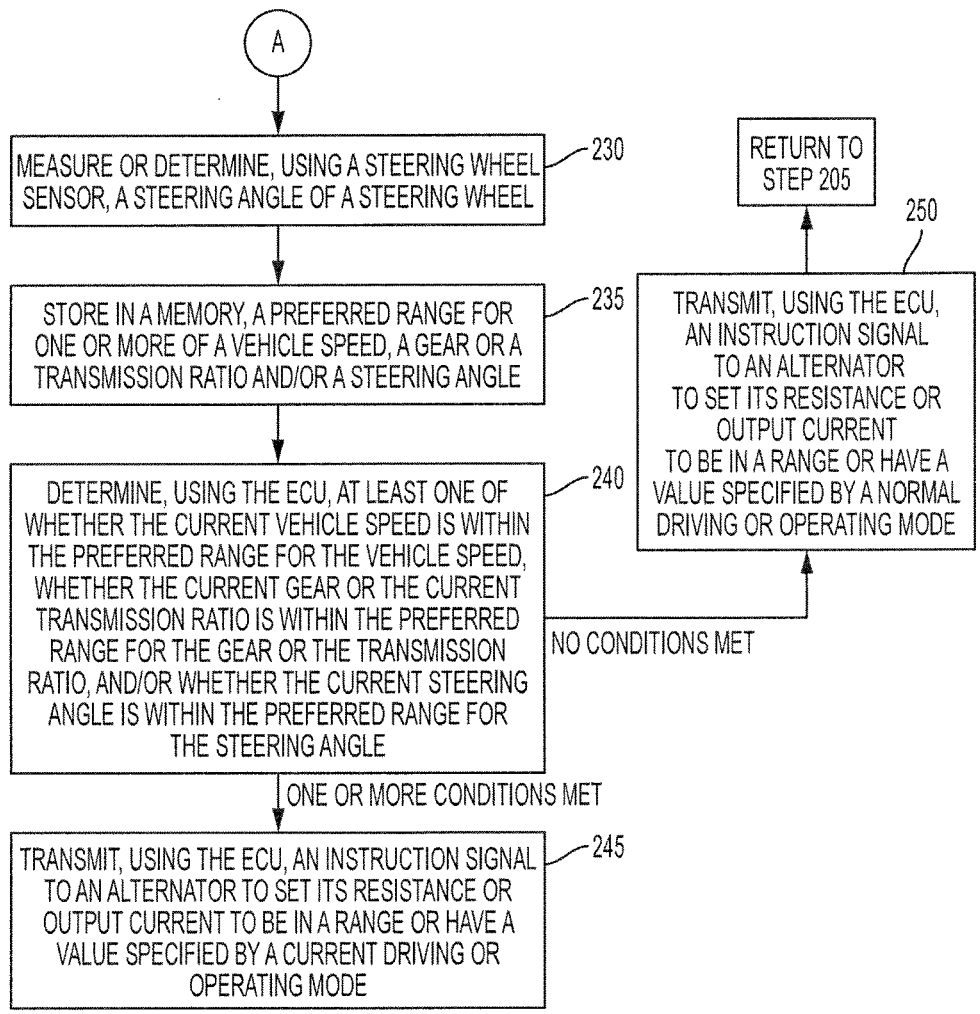

FIGS. 2A and 2B illustrate a flowchart of a method 200 for controlling a vehicle's deceleration level according to an embodiment of the present invention. Referring to FIGS. 1 and 2, the driver of the vehicle 105 uses the accelerator pedal 160 to control the acceleration or movement of the vehicle 105. The accelerator pedal 160 generates or produces a pedal input, which is a value representing an amount or percentage the accelerator pedal 160 is depressed. The amount or percentage the accelerator pedal 160 is depressed can be measured using the accelerator pedal sensor 165. At step 205, the accelerator pedal sensor 165 measures or determines the amount or percentage the accelerator pedal 160 is depressed. In one embodiment, the accelerator pedal sensor 165 simply determines whether or not the accelerator pedal 160 is depressed as opposed to determining the actual amount or percentage the accelerator pedal 160 is depressed. If the accelerator pedal 160 is released or not depressed, the accelerator pedal sensor 165 will have a zero or close to zero measurement or reading. The amount or percentage the accelerator pedal 160 is depressed is transmitted from the accelerator pedal sensor 165 to the ECU 145 (step 210). If the accelerator pedal 160 is depressed, the method 200 repeats steps 205 and 210 until the accelerator pedal 160 is released or not depressed (step 215). If the accelerator pedal 160 is released or not depressed, the method 200 moves to step 220 (step 215).

At step 220, a vehicle speed (in mph or kph) of the vehicle 105 is measured or determined using the vehicle speed sensor 180. The vehicle speed sensor 180 can be coupled to the transmission 135, a rear differential assembly or a wheel assembly coupled to the wheels 190 to measure or determine the vehicle speed. The vehicle speed sensor 180 is electrically connected to the ECU 145. In one embodiment, the vehicle speed sensor 180 may be an angular velocity sensor that measures the rotation of the output shaft of the transmission 135.

At step 225, the ECU 145 determines a gear (e.g., 1, 2, 3, 4, 5, 6, 7, 8, etc.) or a transmission ratio that the transmission 135 is current in.

At step 230, a steering angle of the steering wheel 170 is measured or determined using the steering wheel sensor 175. The steering wheel 170 is coupled to the wheels 190 for controlling the steering of the vehicle 105. The steering wheel sensor 175 is electrically connected to the ECU 145. In one embodiment, the steering wheel sensor 175 may be an angular sensor that measures the amount (in degrees) the steering wheel is rotated (e.g., a steering rotation angle) relative to a straight direction.

A designer or a manufacturer of the system 100 or the vehicle 105 may store a preferred range (also can be referred to as a predetermined range) in the memory 155 for one or more of (1) the vehicle speed, (2) the gear or the transmission ratio and/or (3) the steering angle (step 235). The preferred range is generally not the entire range. As examples, the preferred range for the vehicle speed is 30 kph to 130 kph, the gear is 3-8, the transmission ratio is 0.5 to 1.25 and the steering angle is 0-30 degrees. Preferably, the preferred range is when the vehicle 105 is in the middle range for vehicle speed and gear or transmission ratio and small angles for steering angle to allow the driver to have better control of the vehicle 105. The preferred range advantageously allows the designer or the manufacturer to set when and when not to adjust or alter the deceleration level or rate of the vehicle 105. The preferred ranges allow the designer to set or indicate when to increase or decrease the resistance within the alternator 115, which in turn is used to control the deceleration level or rate of the vehicle 105. For example, assume the preferred range for the gear is 4-6 and the preferred range for the steering angle is 0 degrees to 30 degrees. During vehicle deceleration (i.e., the accelerator pedal 160 is released), the ECU 145 adjusts or alters the amount of current output from the alternator 115 to control the desired deceleration level or rate when the current gear and the current steering angle are within the preferred ranges. These preferred ranges are set for providing enhanced safety and performance of the vehicle 105. In one embodiment, the driver can set these preferred ranges. If the sport mode or sport plus mode is selected, the vehicle 105 has an enhanced deceleration when the one or more conditions is met. As an example, the vehicle 105 would have an enhanced deceleration when travelling at speeds from 70 mph to 40 mph (e.g., the preferred range).

At step 240, the ECU 145 determines at least one of the following: (1) whether the current vehicle speed of the vehicle 105 is within the preferred range for the vehicle speed stored in the memory 155, (2) whether the current gear or the current transmission ratio is within the preferred range for the gear or the transmission ratio stored in the memory 155, and/or (3) whether the current steering angle is within the preferred range for the steering angle stored in the memory 155. If one or more conditions is met, the method 200 proceeds to step 245.

The ECU 145 can transmit an instruction signal to the alternator 115 when one or more of the conditions in step 240 is met. The designer or the manufacturer can determine whether one, two, three, etc. of the conditions and which conditions should be met. That is, the designer or the manufacturer can indicate the conditions are met if two conditions (vehicle speed and transmission ratio) are met. For example, if the ECU 145 determines that the current vehicle speed of the vehicle 105 is within the preferred range for the vehicle speed stored in the memory 155 and the current transmission ratio is within the preferred range for the transmission ratio, then these two conditions are met. If the conditions are met, the ECU 145 provides an instruction signal to the alternator 115. In one embodiment, the preferred range is not the entire range.

The ECU 145 generates the instruction signal based on the selection of the driving mode switch 150. For example, if the driving mode switch 150 is selected to be sport mode, for example, the ECU 145 generates and transmits an instruction signal to the alternator 115 to set its resistance or output current to be in a range or have a value specified by a current driving or operating mode as indicated by the driving mode switch (step 245). The instruction signal increases or decreases the resistance of the alternator 115, which in turn increases or decreases the output current of the alternator 115. The instruction signal increases or decreases the resistance within the alternator 115 so the resulting output current of the alternator 115 is between 40-65 amperes since the sport mode has been selected.

If no condition is met, the ECU 145 generates and transmits an instruction signal to the alternator 115 to set its resistance or output current to be in a range or have a value specified by, for example, a normal driving or operating mode (step 250). For step 250, the alternator 115 has its resistance or output current set to be in a range or have a value that is different from the current driving or operating mode as indicated by the driving mode switch 150. The instruction signal increases or decreases the resistance of the alternator 115, which in turn increases or decreases the output current of the alternator 115. The instruction signal increases or decreases the resistance within the alternator 115 so the resulting output current of the alternator 115 is between 30-40 amperes indicating the normal mode. Therefore, even though the sport mode is selected by the driver, the ECU 145 controls the resistance within the alternator 115 to product output current as if the vehicle 105 was in the normal mode. Therefore, the ECU 145 is providing a deceleration level or rate that is dictated by the normal driving or operating mode as opposed to the driving or operating mode dictated by the driver (i.e., the driving mode switch 150). This is because none of the conditions were met. This ultimately produces a slower deceleration level or rate. If the driving or operating mode dictated by the driver is economy mode, the deceleration level or rate of the normal mode would ultimately produce a faster deceleration level or rate.

A higher resistance within the alternator 115 causes the alternator 115 to produce more current (e.g., 65-75 amperes), which results in the battery 120 being charged at a much faster rate. Similarly, a lower resistance within the alternator 115 causes the alternator 115 to produce less current (e.g., 30-40 amperes), which results in the battery 120 being charged at a much slower rate. If the designer or the manufacturer wants a high deceleration G, the alternator output current should be high, and if the designer or the manufacturer wants a low deceleration G, the alternator output current should be low. In addition, the change in resistance within the alternator 115 is used to directly control the deceleration level or rate of the vehicle 105. That is, the ECU 145 is able to directly control the deceleration level or rate of the vehicle 105 by generating and transmitting an instruction signal to the alternator 115 to increase or decrease its resistance. After receiving the instruction signal from the ECU 145, the resistance within the alternator 115 is increased or decreased depending on the instruction signal. The instruction signal provides a target value (or range) indicating a desired value (or range) to change the resistance to within the alternator 115 and/or a desired value (or range) to change the output current of the alternator 115.

Figure 3:
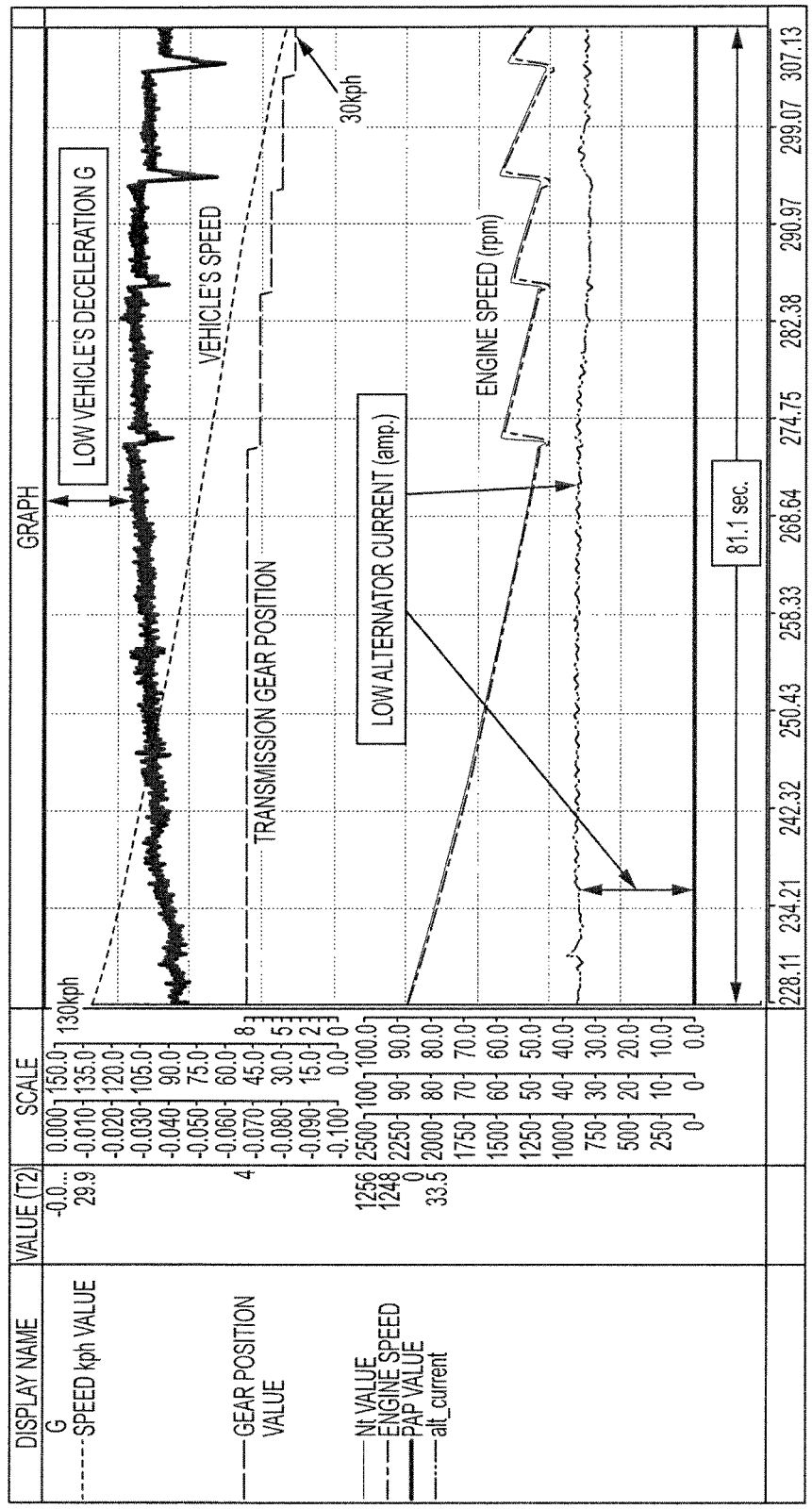
FIG. 3 illustrates a graph showing the alternator with a low output current when the driving mode switch is set to an economy mode according to an embodiment of the present invention.

FIG. 3 illustrates a graph showing the alternator 115 with a low output current when the driving mode switch 150 is set to, for example, an economy mode according to an embodiment of the present invention. The low output current of the alternator 115 results in a slower vehicle deceleration (i.e., a lower vehicle deceleration G). For example, as shown in FIG. 3, when the alternator 115 has a low output current of about 35 amperes, the vehicle 105 decelerates from 130 kph to 30 kph in approximately 81.1 seconds.

Figure 4:
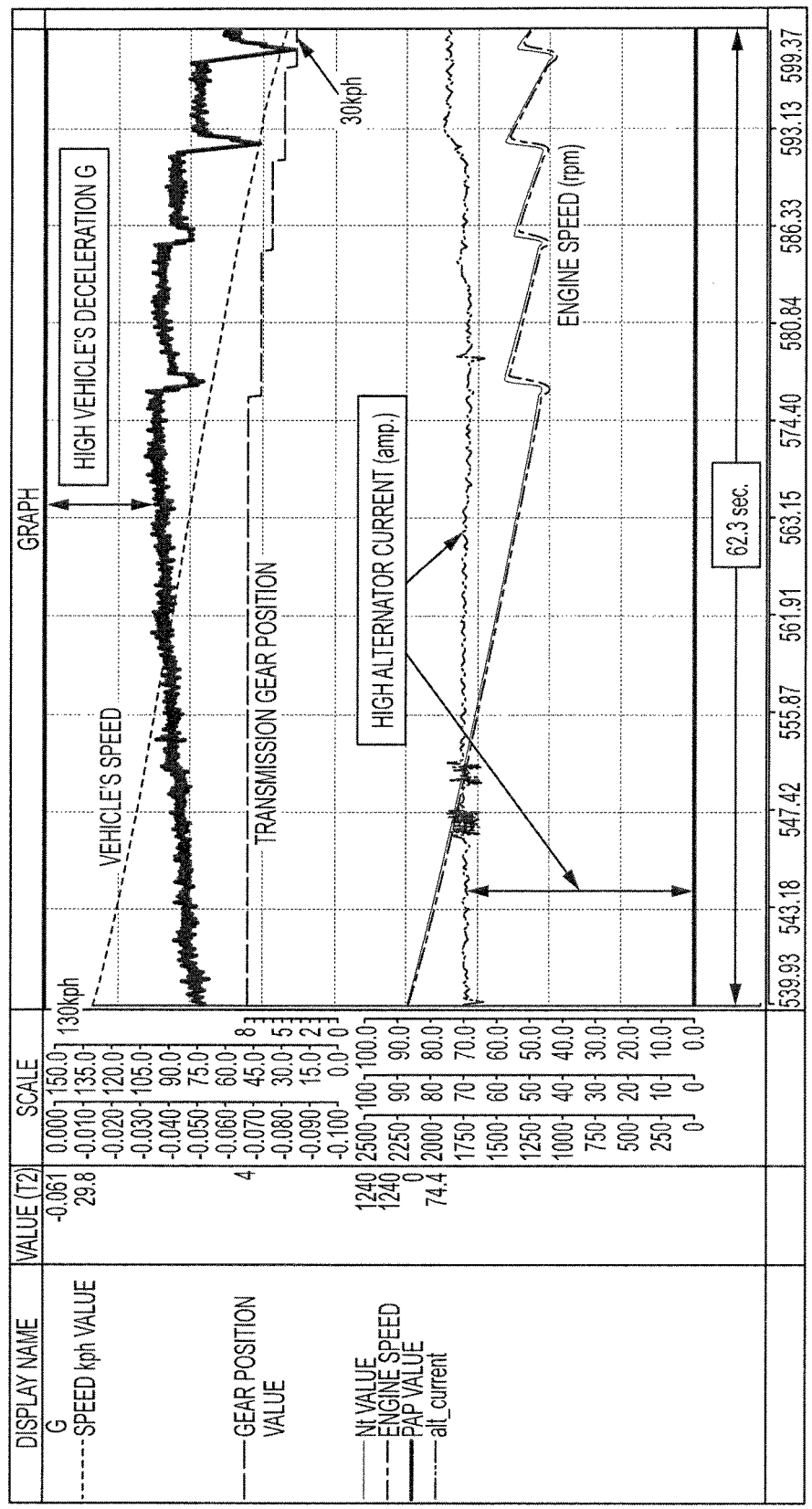
FIG. 4 illustrates a graph showing the alternator with a high output current when the driving mode switch is set to a sport plus mode according to an embodiment of the present invention.

FIG. 4 illustrates a graph showing the alternator 115 with a high output current when the driving mode switch 150 is set to, for example, a sport plus mode according to an embodiment of the present invention. The high output current of the alternator 115 results in a faster vehicle deceleration (i.e., a higher vehicle deceleration G). As shown in FIG. 4, when the alternator 115 has a high output current of about 70 amperes, the vehicle 105 decelerates from 130 kph to 30 kph in approximately 62.3 seconds. In these examples, with the high alternator output, the vehicle takes 18.8 seconds less to decelerate the same speed amount.

By comparing FIG. 3 to FIG. 4, one skilled in the art can see that the greater output current of the alternator 115, the faster the deceleration level or rate.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for controlling a deceleration level or rate of a vehicle, comprising:
   an accelerator pedal configured to control an acceleration or movement of the vehicle;
   an accelerator pedal sensor configured to determine whether the accelerator pedal is depressed or released;
   an alternator having a resistance and an output current;
   a driving mode switch being set in a respective driving mode of a plurality of driving modes, the plurality of driving modes including an economy mode, a normal mode and a sport mode, each of the economy mode, the normal mode and the sport mode being associated with a different predetermined resistance or output current range for the alternator, the respective driving mode being one of the economy mode, the normal mode or the sport mode to control the deceleration level or rate of the vehicle;
   and
   an electronic control unit configured to:
      transmit a first instruction signal to the alternator to increase or decrease the resistance or the output current of the alternator when the accelerator pedal is released based on the predetermined resistance or output current range associated with the respective driving mode set by the driving mode switch.

2. The system of claim 1 further comprising a vehicle speed sensor for determining a vehicle speed of the vehicle, wherein the electronic control unit is further configured to transmit a second instruction signal to the alternator to increase or decrease the resistance or the output current of the alternator when the accelerator pedal is released and the vehicle speed is outside a preferred range of the vehicle speed based on the respective driving mode being in the normal mode.

3. The system of claim 1 wherein the output current range for the alternator when the respective mode is the sport mode is greater than the output current range for the alternator when the respective mode is the normal mode and the output current range for the alternator when the respective mode is the normal mode is greater than the output current range for the alternator when the respective mode is the economy mode.

4. The system of claim 1, further comprising a memory that stores a preferred range for a gear or a transmission ratio and the electronic control unit is configured to:
   transmit the first instruction signal to the alternator when a current gear or a current transmission ratio of a transmission is within the preferred range for the gear or the transmission ratio, and
   transmit the second instruction signal to the alternator when the current gear or the current transmission ratio of the transmission is outside the preferred range for the gear or the transmission ratio.

5. A system for controlling a deceleration level or rate of a vehicle, comprising:
   an accelerator pedal configured to control an acceleration or movement of the vehicle;
   an accelerator pedal sensor configured to determine an amount or a percentage the accelerator pedal is depressed;
   an alternator having a resistance and an output current;
   a driving mode switch being set in a respective driving mode of a plurality of driving modes, the plurality of driving modes including an economy mode, a normal mode and a sport mode, each of the economy mode, the normal mode and the sport mode being associated with a different predetermined resistance or output current range for the alternator, the respective driving mode being one of the economy mode, the normal mode or the sport mode to control the deceleration level or rate of the vehicle;
   a vehicle speed sensor for determining a vehicle speed of the vehicle;
   a memory for storing a preferred range for the vehicle speed; and
   an electronic control unit configured to:
   determine that the vehicle speed is within the preferred range, and
   transmit a first instruction signal to the alternator to increase or decrease the resistance or the output current of the alternator when the amount or the percentage the accelerator pedal is depressed is substantially zero and the vehicle speed is within the preferred range based on the predetermined resistance or output current range associated with the respective driving mode.

6. The system of claim 5 wherein the preferred range for the vehicle speed is 30 kph to 130 kph.

7. The system of claim 5 wherein the electronic control unit is further configured to transmit a second instruction signal to the alternator to increase or decrease the resistance or the output current of the alternator when the amount or the percentage the accelerator pedal is depressed is substantially zero and the vehicle speed is outside the preferred range for the vehicle speed based on the respective driving mode being in the normal mode.

8. The system of claim 5 further comprising:
   a steering angle sensor for determining a steering rotation angle of the vehicle that indicates an amount a steering wheel of the vehicle is rotated;
   wherein the memory stores a preferred range for the steering rotation angle and the electronic control unit is configured to transmit a second instruction signal to the alternator when the steering rotation angle is outside the preferred range for the steering rotation angle.

9. The system of claim 8 wherein the preferred range for the steering rotation angle is 0-30 degrees.

10. The system of claim 7 wherein the memory stores a preferred range for a gear or a transmission ratio and the electronic control unit is configured to:
    transmit the first instruction signal to the alternator when a current gear or a current transmission ratio of a transmission is within the preferred range for the gear or the transmission ratio, and
    transmit the second instruction signal to the alternator when the current gear or the current transmission ratio of the transmission is outside the preferred range for the gear or the transmission ratio.

11. The system of claim 10 wherein the preferred range for the gear is 3-8.

12. The system of claim 10 wherein the preferred range for the transmission ratio is 0.5 to 1.25.

13. A method for controlling a deceleration level or rate of a vehicle having an accelerator pedal, the method comprising:
    determining, using an accelerator pedal sensor, whether the accelerator pedal is depressed or released;
    determining, using a steering angle sensor, a steering rotation angle of the vehicle;
    determining, using an electronic control unit, a current setting of a driving mode switch, the current setting of the driving mode switch being one of an economy mode, a normal mode or a sport mode that controls the deceleration level or rate of the vehicle, each of the economy mode, the normal mode and the sport mode being associated with a different predetermined resistance or output current range for the alternator;
    storing, in a memory coupled to the electronic control unit, a preferred range for the steering rotation angle; and
    transmitting, using the electronic control unit, a first instruction signal to an alternator to increase or decrease a resistance or an output current of the alternator when the accelerator pedal is released and the steering rotation angle is within the preferred range for the steering rotation angle based on the predetermined resistance or output current range associated with the current setting of the driving mode switch.

14. The method of claim 13 further comprising:
    storing, in the memory, a preferred range for a vehicle speed, wherein the preferred range for the vehicle speed is 30 kph to 130 kph; and
    transmitting, using the electronic control unit, the first instruction signal to the alternator to increase or decrease the resistance or the output current of the alternator further when the vehicle speed is within the preferred range for the vehicle speed.

15. The method of claim 13 further comprising transmitting, using the electronic control unit, a second instruction signal to the alternator to increase or decrease the resistance or the output current of the alternator when the accelerator pedal is released and the vehicle speed is outside the preferred range for the vehicle speed based on the current setting being in the normal mode.

16. The method of claim 13 further comprising transmitting, using the electronic control unit, a second instruction signal to the alternator when the steering rotation angle is outside the preferred range for the steering angle.

17. The method of claim 16 wherein the preferred range for the steering rotation angle is 0-30 degrees.

18. The method of claim 13 further comprising:
storing, in the memory, a preferred range for a gear or a transmission ratio; and
transmitting, using the electronic control unit, the first instruction signal to the alternator when a current gear or a current transmission ratio of a transmission is within the preferred range for the gear or the transmission ratio and a second instruction signal to the alternator when the current gear or the current transmission ratio of the transmission is outside the preferred range for the gear or the transmission ratio.

19. The method of claim 18 wherein the preferred range for the gear is 3-8.

20. The method of claim 18 wherein the preferred range for the transmission ratio is 0.5 to 1.25.

\* \* \* \* \*